(12) United States Patent
Frank et al.

(10) Patent No.: US 6,728,547 B1
(45) Date of Patent: Apr. 27, 2004

(54) CALL SETUP IN MOBILE SYSTEMS

(75) Inventors: Robert Frank, Stockholm (SE); Mats Olof Winroth, Poing (DE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/530,586

(22) PCT Filed: Nov. 3, 1998

(86) PCT No.: PCT/SE98/01988

§ 371 (c)(1),
(2), (4) Date: Oct. 26, 2000

(87) PCT Pub. No.: WO99/25107

PCT Pub. Date: May 20, 1999

(30) Foreign Application Priority Data

Nov. 6, 1997 (SE) .............................................. 9704058

(51) Int. Cl.7 ................................................. H04Q 7/20
(52) U.S. Cl. ....................................... 455/466; 455/558
(58) Field of Search ................................ 455/466, 558, 455/566, 567, 418, 419, 420, 88

(56) References Cited

U.S. PATENT DOCUMENTS

| | | | |
|---|---|---|---|
| 5,001,709 A | | 3/1991 | Satoh |
| 5,963,620 A | * | 10/1999 | Frankel et al. ........... 379/93.05 |
| 5,983,096 A | * | 11/1999 | Lietha et al. ................ 455/416 |
| 6,085,321 A | * | 7/2000 | Gibbs et al. ................ 713/170 |
| 6,185,436 B1 | * | 2/2001 | Vu .............................. 455/558 |
| 6,249,584 B1 | * | 6/2001 | Hamalainen ................ 380/270 |

FOREIGN PATENT DOCUMENTS

| | | |
|---|---|---|
| EP | 0 436 345 | 7/1991 |
| WO | WO 96/27974 | 9/1996 |

* cited by examiner

*Primary Examiner*—Lee Nguyen
(74) *Attorney, Agent, or Firm*—Oblon, Spivak, McClelland, Maier & Neustadt, P.C.

(57) ABSTRACT

The invention relates to a method at a mobile tele and data communication system, which makes possible for an A-subscriber to transmit data to an application in the B-subscriber's mobile terminal in connection with the call setup. Examples of transferred data can be information which in the B-subscriber's mobile terminal executes a specific ringing melody, a personal logotype etc. The invention is characterized in that UUS is used as carrier to, at the setup, transfer this data information to the application in the B-subscriber's mobile terminal.

11 Claims, No Drawings

CALL SETUP IN MOBILE SYSTEMS

BACKGROUND OF THE INVENTION

1. Field of the Invention

The present invention relates to a method at a mobile tele and data communication system for call setup between an A-subscriber and a B-subscriber.

2. Discussion of the Background

In the GSM of today there is no possibility for a GSM-user to, at calling, transfer a personal ringing signal to a receiving GSM-mobile. In Nokia's "Smart Messaging"-concept a user can collect a ringing signal to his/her own Nokia 8110 via the radio interface, but cannot transmit a ringing signal at calling another GSM-customer. Neither can the user, at the setup of a call, transfer an application which, for instance, might be a personal graphic symbol, a simple moving graphic picture, or a hypertext page, which can be shown on the display of the receiving GSM-mobile. Moreover, there is no possibility to authenticate a user already at the setup of the call. One, or possibly all, of these functions would certainly become very popular services in GSM if they would be realized.

The problem consequently can be summarized in that an A-subscriber cannot transmit data to an application in the B-subscriber's mobile in connection with the setup of the call. Examples of data may be a specific ringing melody, a personal logotype etc.

The aim of the following invention consequently is to solve this problem.

SUMMARY OF THE INVENTION

The above mentioned aim is achieved by a method at a mobile tele and data communication system for setup of call between an A-subscriber and a B-subscriber, where UUS is used as carrier to, at said setup of call, transfer data information to an application at said B-subscriber.

A big advantage of the invention is that it can be used to differentiate the service offering of different operators. Operators can offer new, attractive service functions, which of course will increase their revenues.

Further characteristics of the invention are given in the subclaims.

In the following a detailed description of an embodiment of the invention is given.

DETAILED DESCRIPTION OF THE INVENTION

With today's technology data to an application in the B-subscriber's mobile cannot, as has been mentioned above, be transferred at setup of a call, for instance a personal ringing melody which is played instead of a default ringing signal, that a personal logotype is shown on the receiver's display, or that an authentication can be made already at the setup of a call.

The invention attends to this by means of the functions which now will be described below.

SIM Application Toolkit is included in GSM phase 2+, and i.a. gives SIM possibility to show text in mobile display, transmit SMS, establish call, transmit USSD-string, initiate dialogue with mobile users and mechanism to transfer data to SIM from the network. USSD stands for Unstructured Supplementary Services Data, and is a data channel which can be used to transmit data between network and mobile. In phase 2+ USSD is developed to become a general carrier.

Java Card API is a java standard which has been developed for smart cards (for instance GSM's SIM is a smart card). Java Card API makes it possible to implement a java interpreter on the SIM, which i.a. results in that the operator has possibility to either download an own-developed java application on the card, before it is handed over to the customer, or load down an application via, for instance, SMS. Together with SIM Application Toolkit, there will be possibilities to develop very advanced functions and applications.

Embedded Java, Personal Java, are java standards which have been developed to be used in products with limited processor capacity and memory. A typical product can be a mobile telephone. The mobile manufacturer has for a long time worked with Java in the mobile terminal, but now also work within ETSI has started to achieve a standard. Within a few years all "high end" telephones will support Java (according to well-informed sources at Ericsson Mobile). Java applications can be transferred to the mobile in a number of different ways: from SIM (where for instance an operator specific application can be located), via SMS, USSD, GPRS, or data from the network, and via i.a. UUS from another user.

UUS (User to User Signalling): The function is inherited from ISD and supports transmission of smaller amounts of user data at the setup, during call, and at the termination of the call. In the case with UUS at the setup, there is a field specified in the "SET UP"message, where up to 35 octets of user information can be transferred to the B-subscriber. During a call, one or more continuous packets of 131 octets of user data can be transferred on the main signalling channel, FACCH.

The invention also can be used in another or future system where there are, or will be, functions similar to those described above. One example is ISDN, where the functionality already exists.

Provided that the GSM-mobile and SIM supports Java, SIM Application Toolkit and UUS, the problems above can be solved in the following way.

1. A GSM-user establishes a connection towards a GSM-mobile. By USS a frame, max. 35 octets long, consisting of an information header (of one or two octets) and a data field, is transferred. The information in the header can consist of application as well as how many octets user data the frame contains. It means that the maximal amount of application data which can be transferred to an application in the B-subscriber's GSM-telephone consists of 33 or 34 octets.

2. When the receiving side detects that the SET-UP-message contains a UUS-data field, the UUS data is transferred to an application in the mobile (or the SIM) which reads the data header, where information exists about which application at the SIM, or in the mobiles that shall be started.

3. The application, which establishes the call and transmits the UUS-message, can use SIM Application Toolkit to manage call setup, provided that SIM Application Toolkit is extended with functionality for UUS. Similar functionality, however, will exist via the Java interpreter in the mobile.

The invention is characterized in:

that UUS (User to User Signalling) is used as carrier to, at the setup, transfer data information to an application in called GSM-mobile;

that the data frame, which at setup is maximally 35 octets, consists of a header containing information about application, length of user data, etc, and of a user data field, 33 or 34 octets;

that one application at the A-subscriber establishes a call setup where a UUS-data packet is incorporated;

that one application at the B-subscriber, on basis of the header information in the UUS-packet, can decide requested application and start this application in the subscriber's mobile;

that the applications are developed in Java, or other suitable language;

that one application is that a user can define his/her own personal melody, which at setup of call is transmitted to the B-subscriber's mobile, where it is played back, instead of default ringing signal;

that one application is that a graphic symbol, moving or static, is shown on the B-subscriber's mobile. For a moving picture, a library of movement patterns is required in receiving application;

that one application is authentication of the A-subscriber already at setup;

that UUS is defined also for ISDN, so the invention can be used also in environment with only ISDN or ISDN-GSM;

that the invention, as a whole or parts of it, applies to present and future mobile telephone systems with similar functionality;

that the applications can be downloaded on SIM-cards, by the operator, already at subscription.

In the following a number of examples of possible applications of the invention are given:

An A-subscriber's personal ringing signal is transferred and played back as ringing signal in the B-subscriber's GSM mobile telephone:

In the A-subscriber's mobile, an application is required which can set up a call which includes a UUS-data packet.

In the B-subscriber's mobile, one or two applications are required (can, but must not necessarily be a Java application) which from the header information of the data frame can decide which application that is intended and start that application, here a ringing signal application, with the user data in the frame as in-argument. Because the maximal amount of data that UUS can transmit at call setup is 35 octes, more than 35 tones can be transferred, where each tone, tone pitch and duration can be described by 6 or 7 bits.

The application instead can consist of a simple bitmapped symbol which moves across the screen. The symbol can, for instance, consist of 32 octets (for instance a 16×16 bits picture), at which other data can be used to select a movement pattern from a library which is in the B-subscriber's application.

Together with a mobile-adapted WWW-browser, a short hypertext page can be transferred to the mobile, where the B-subscriber with a pointer marks a line, and by means of USSD in SMS transmits a request about to get, via SMS or USSD (or possibly UUS), wanted information. On the receiving side, an application that can reformat the only 33 or 34 octet long information to suitable format, is required.

A security application can be used to authenticate a calling mobile already at the call setup. It can be used, for instance, at access to its bank, access to a premises network, or even for authenticating a person who is calling another GSM-mobile.

The application in the mobile, alternatively the SIM-card, may require that a password is stated before the call is set up. In the future—depending on when the technology is ready for implementation in GSM—the application in the mobile can, instead of a password, use voice authentication to identify the A-subscriber before the call is set up. After correct password being entered, the application works out a code word, based on, for instance, IMSI, the password (alt. approved voice authentication) and code key (stored in the application). The code word is transferred, via UUS to a receiver application on the other side, which has access to code key and list of user identities. The receiver by that can authenticate the calling subscriber via the transferred code word.

The application which, for instance, a bank customer uses in such a process can be transferred from the bank to him/her via, for instance, USSD or SMS. A code word for the application is communicated to the bank customer in another way. In the same way a mobile subscriber can transmit a security application to another mobile subscriber.

Specific applications can be operator specific by downloading these on the SIM-cards when the customer subscribe. This make possibilites for differentiation.

Since the processor capacity of the SIM of today is limited, the application possibly has to be transferred from the memory in SIM to a memory in the mobile, from where the application later can be run via, for instance, a Java interpreter in the mobile. Data from the UUS-message can be enclosed as argument to the application.

Another method, which can be used to transfer an application to a mobile, can be from an Internet server via mobile-adapted WWW-browser. One example is "Smart Messaging", which is Nokia's name for a WWW-similar application which can be run in a mobile, where data can be transferred via SMS or USSD.

Further, an application can be downloaded to the telephone via the serial interface of the mobile.

The application must be possible to switch off, in order to retrieve the normal ringing signal behaviour when the user so wishes.

The above mentioned is only to be regarded as an advantageous embodiment of the invention, and the extent of the invention is only defined by what is indicated in the following patent claims.

What is claimed is:

1. A method of exchanging data between mobile terminals of a data communication system, the method comprising:
   establishing a call setup between an A-subscriber and a B-subscriber; and
   utilizing UUS as a carrier to, at the call setup, transfer an executable code to at least one application at the B-subscriber,
   wherein the executable code includes a data frame including a header and a data field, the header includes information about the at least one application and the data field constitutes in-parameter for an execution of the at least one application.

2. The method according to claim 1, wherein said at least one application is implemented in a SIM-card at the B-subscriber's mobile terminal.

3. The method according to claim 2, wherein said at least one application is developed in JAVA.

4. The method according to claim 3, wherein JAVA-applications are transferred to the A-subscriber's and the B-subscriber's mobile terminals, respectively, via SMS, USSD or GPRS.

5. The method according to claim 1, wherein the A-subscriber's mobile terminal utilizes SIM Application Toolkit to transfer said executable code to said B-subscriber's mobile terminal.

6. The method according to claim 1, wherein said mobile terminals are GSM-terminals with SIM-cards which support JAVA, SIM Application Toolkit and UUS.

7. The method according to claim 6, wherein establishing the call setup includes extending a SIM Application Toolkit function with functionality for the UUS, and transferring said executable code via the UUS, from said A-subscriber's mobile terminal to said B-subscriber's mobile terminal and, wherein the B-subscriber's mobile terminal detects said executable code, said header in said executable code defines an application to be executed, and the data field in said executable code constitutes in-parameter to the application to be executed in the B-subscriber's mobile terminal.

8. The method according to claim 1, wherein the executable code enables the A-subscriber to define his/her own personal melody, which at the call setup is transferred to the B-subscriber's mobile terminal where the melody is played.

9. The method according to claim 1, wherein the at least one application authenticates said A-subscriber at the call setup.

10. The method according to claim 9, wherein said at least one application provides a password before the call setup.

11. The method according to claim 9, wherein said at least one application provides a voice authentication to identify said A-subscriber before the call setup.

* * * * *